US007262518B2

(12) United States Patent
Nagano et al.

(10) Patent No.: US 7,262,518 B2
(45) Date of Patent: Aug. 28, 2007

(54) DOOR LOCK/UNLOCK SYSTEM

(75) Inventors: Teppei Nagano, Kanagawa (JP); Tetsuya Asada, Kanagawa (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 633 days.

(21) Appl. No.: 10/681,371

(22) Filed: Oct. 9, 2003

(65) Prior Publication Data

US 2006/0175899 A1 Aug. 10, 2006

(30) Foreign Application Priority Data

Oct. 9, 2002 (JP) ............................ 2002-296724

(51) Int. Cl.
*B60L 1/00* (2006.01)
*B60L 3/00* (2006.01)
*H02G 3/00* (2006.01)

(52) U.S. Cl. .................................................... 307/10.1

(58) Field of Classification Search ................ 307/10.1
See application file for complete search history.

(56) References Cited

U.S. PATENT DOCUMENTS 4,730,120 A 3/1988 Okada
5,621,251 A * 4/1997 Yamazaki .................. 307/10.2
6,441,512 B1 8/2002 Jakel et al.
7,068,146 B2 * 6/2006 Sasaki et al. ............. 340/5.72

FOREIGN PATENT DOCUMENTS

EP 1 176 064 A1 1/2002
JP 1-177364 12/1989

* cited by examiner

*Primary Examiner*—Michael Sherry
*Assistant Examiner*—Carlos Amaya
(74) *Attorney, Agent, or Firm*—McDermott Will & Emery LLP

(57) ABSTRACT

A door lock/unlock system for a vehicle is comprised of a door lock state detector for detecting a door lock/unlock state, a door open state detector for detecting a door open/close state, a door lock mechanism for locking and unlocking a door, and a controller. The controller is arranged to compare a first lock/unlock state detected during the door open state with a second lock/unlock state detected at a moment when an open/close state is changed from an open state to a closed state, to maintain the state of the door lock mechanism when the first lock/unlock state corresponds to the second lock/unlock state, and to set the state of the door lock mechanism at the first lock/unlock state when the first lock/unlock state does not corresponds to the second lock/unlock state.

10 Claims, 2 Drawing Sheets

DOOR LOCK/UNLOCK SYSTEM

BACKGROUND OF THE INVENTION

The present invention relates to a door lock/unlock system, and more particularly to a door lock/unlock control system for vehicle doors.

Japanese Utility Model Publication No. (Heisei) 1-177364 discloses a locking knob for locking and unlocking a vehicle door from a passenger compartment of a vehicle.

SUMMARY OF THE INVENTION

However, there is a possibility that when a door provided with such a locking knob is radically closed, the locking knob changes its state between an unlock state and a lock state due to an impact of the radical door closing. For example, in the event that the door is radically closed under the unlock state of the locking knob, there is a possibility that the door is locked due to the impact and a vehicle key is be left in a vehicle passenger compartment. In the event that the door is radically closed under the locked state of the locking knob, there is a possibility that the door is unlocked due to the impact.

It is an object of the present invention to provide a door lock/unlock system which correctly sets a lock/unlock state of each vehicle door even when the door is radically closed.

An aspect of the present invention resides in a lock/unlock system which is for a vehicle and comprises a door lock state detector for detecting whether a door of the vehicle is put in a lock state, a door open state detector for detecting whether the door is open, a door lock mechanism through which the door is locked and unlocked, and a controller connected to the door lock state detector, the door open state detector and the door actuator. The controller is arranged to compare a first lock/unlock state detected during the door open state with a second lock/unlock state detected at a moment when an open/close state is changed from an open state to a closed state, to maintain the state of the door lock mechanism when the first lock/unlock state corresponds to the second lock/unlock state, and to set the state of the door lock mechanism at the first lock/unlock state when the first lock/unlock state does not corresponds to the second lock/unlock state.

Another aspect of the present invention resides in a method for controlling a lock/unlock state of a door of a vehicle. The method comprises an operation of detecting whether the door is put in a lock state, an operation of detecting whether the door is open, and operation of comparing a first lock/unlock state detected during the door open state with a second lock/unlock state detected at a moment when an open/close state is changed from an open state to a closed state, an operation of maintaining the state of a door lock mechanism for locking and unlocking the door when the first lock/unlock state corresponds to the second lock/unlock state, and an operation of setting the state of the door lock mechanism at the first lock/unlock state when the first lock/unlock state does not corresponds to the second lock/unlock state.

The other objects and features of this invention will become understood from the following description with reference to the accompanying drawings.

DETAILED DESCRIPTION OF THE INVENTION

Figure 1:
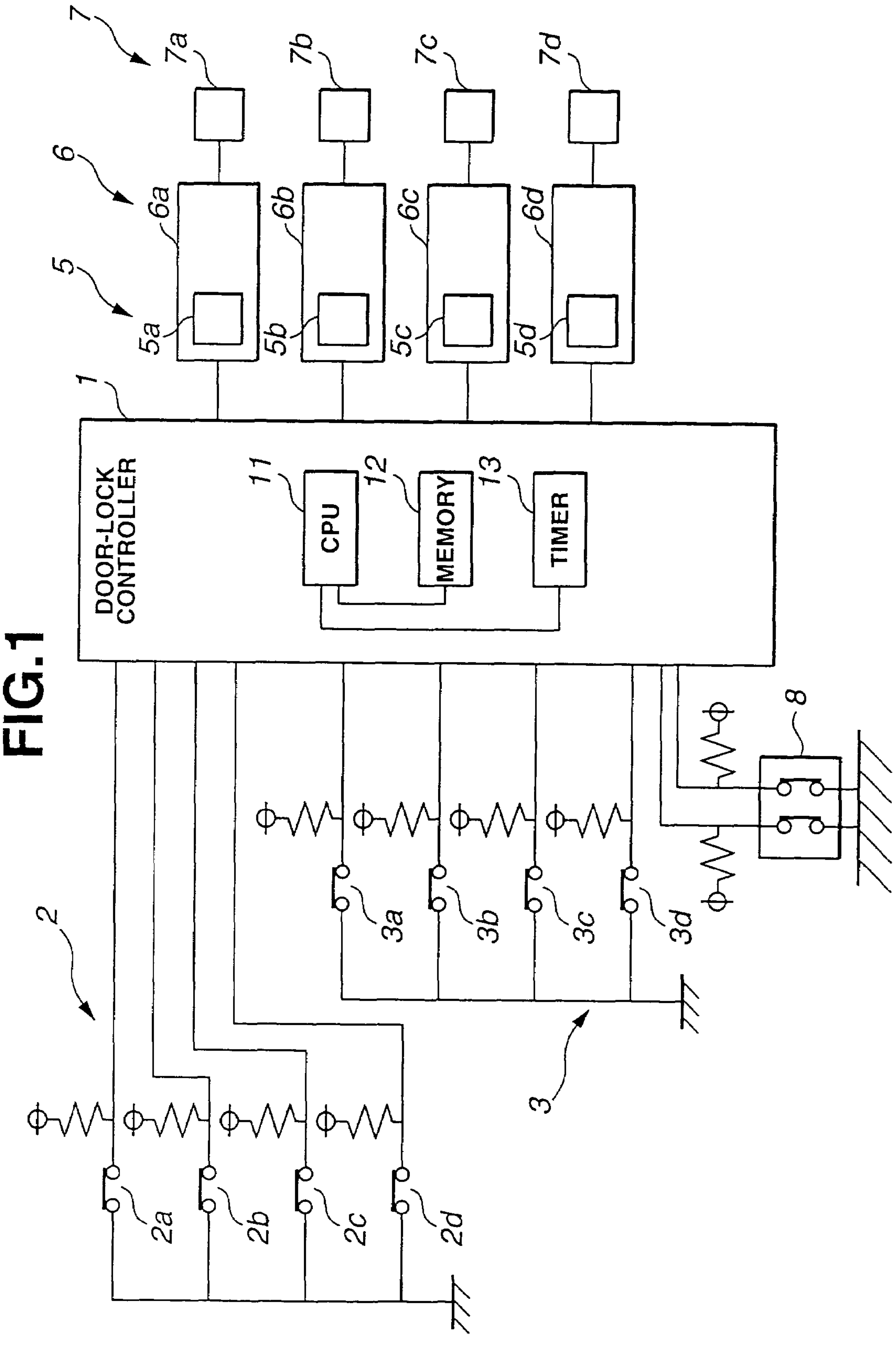
FIG. 1 is a block diagram showing a door-lock/unlock system according to an embodiment of the present invention.
Figure 2:
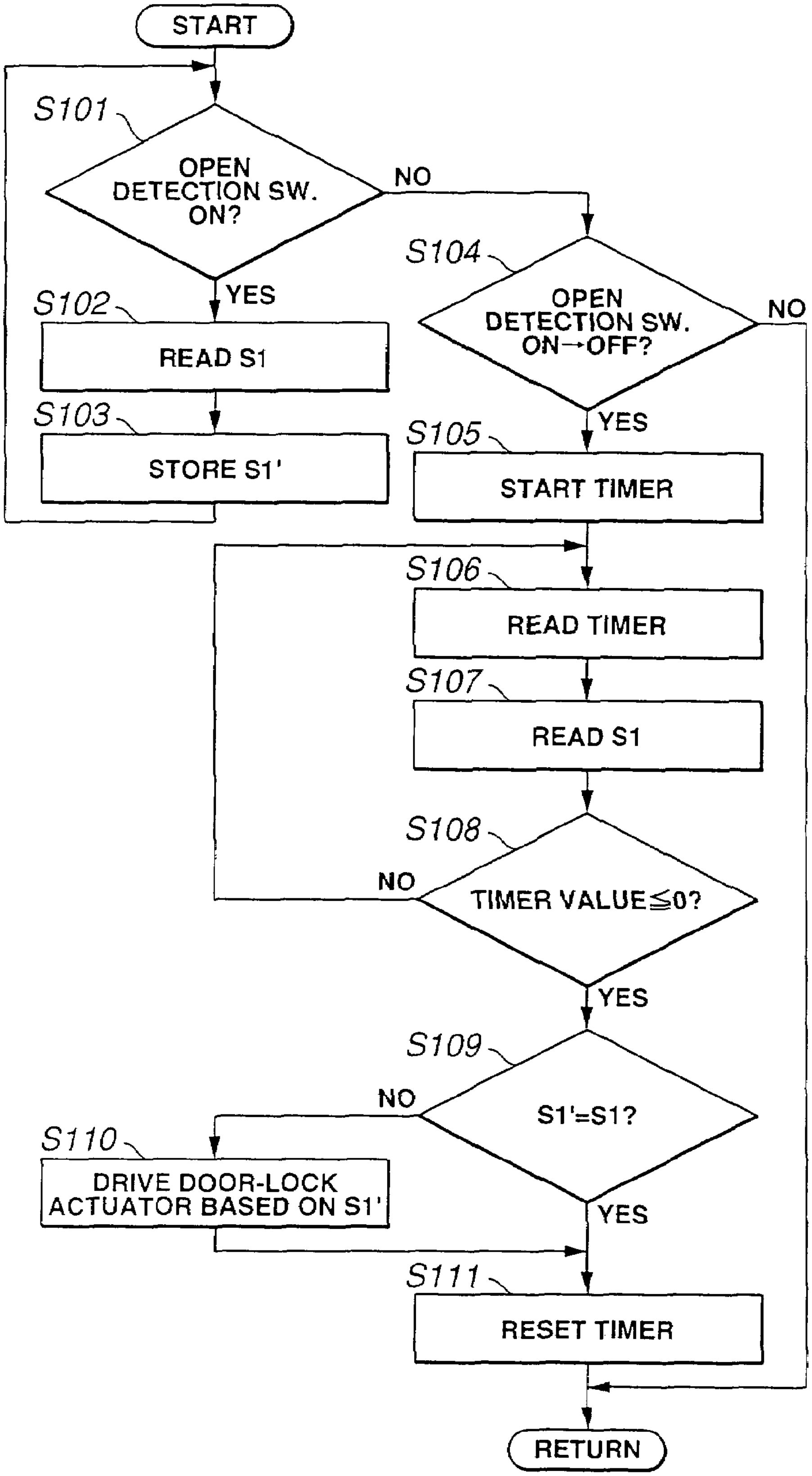
FIG. 2 is a flowchart showing an operation of the door lock/unlock system.

Referring to FIGS. 1 and 2, there is shown an embodiment of a door lock/unlock system according to the present invention.

As shown in FIG. 1, the door lock/unlock system is for doors of a vehicle and therefore comprises door lock mechanisms 6 (6*a*, 6*b*, 6*c* and 6*d*) for the respective doors. Each door lock mechanism 6 is interconnected with each door locking knob 7 (7*a*, 7*b*, 7*c*, 7*c*) provided inside each door via a rod or cable. Further, each door lock mechanism 6 comprises a door lock actuator 5 (5*a*, 5*b*, 5*c*, 5*d*) through which each door lock mechanism 6 is driven door lock actuator 5 is connected to a CPU 11 of a door-lock controller 1.

Each door locking knob 7 changes its position between a lock state and an unlock state according to the lock or unlock state of door lock mechanism 6. When the door lock mechanism 6 is put in the lock state, the door opening operation using an inside handle provided inside the door or an outside door handle provide outside the door is prevented.

A door-lock-state detection switch 2 (2*a*, 2*b*, 2*c*, 2*d*) for detecting a lock state of the door is provided in each door lock mechanism 6 of each door. Door-lock-state detection switch 2 is put in an off state when door lock mechanism 6 is put in the lock state, and is put in an on-state when door lock mechanism 6 is put in the unlock-state. Door-lock-state detection switch 2 outputs a signal indicative of the on or off state thereof to CPU 11 of door-lock controller 1. Door-lock-state detection switch 2 is attached to each door, and therefore there are provided four door-lock-state detection switches 2*a*, 2*b*, 2*c* and 2*d* in the vehicle.

A door-open-state detection switch 3 (3*a*, 3*b*, 3*c*, 3*d*) for detecting an open/close state of each door is provided in the vicinity of each door. Door-open-state detection switch 3 is put in an on-state when the door is put in an open state, and is put in an off-state when the door is put in a close state. Door-open-state detection switch 3 outputs a signal indicative of the on or off state thereof to CPU 11 of door-lock controller 1. Door-open-state detection switch 3 is attached to each door, and therefore there are provided four door-open-state detection switches 3*a*, 3*b*, 3*c* and 3*d* in the vehicle.

Further, an overlay switch 8 is connected to CPU 11 and independently outputs a signal indicative of an on or off state thereof to CPU 11. Overlay switch 8 representatively executes the lock/unlock operation of a concentration lock/unlock operation switch provided near a driver's seat, an automatic lock operation executed according to the vehicle speed after the vehicle starts traveling, and an automatic unlock operation executed when an impact is detected.

CPU 11 of door-lock controller 1 controls door lock actuators 5*a*, 5*b*, 5*c* and 5*d* according to the decision result of the change of the door lock/unlock state at the moment when the state of the door is changed from the open state to the close state, or according to the signal from overlay switch 8.

Door-lock controller 1 comprises a memory 12 and a timer 13 which are connected to CPU 11. CPU 11 stores the signal indicative of the lock state of the corresponding door when the corresponding door is open. CPU 11 starts timer 13 when it is determined from the signal of door-open-state detection switch 3 that the open state of each door is changed from the open state to the close state, in order to obtain a signal indicative of an elapsed time from timer 13.

When CPU 11 detects from door-open-detection switch 3 that the door open/close state is changed from the open state to the closed state, CPU 11 continuously reads the signal of door lock state detection switch 2 for a predetermined time period counted by timer 13, such as 500 milliseconds.

Further, CPU 11 compares the stored signal of door lock detection switch 2 stored in memory 12 at a moment just before the door is closed from the open state with the signal obtained after the door is closed. CPU 11 controls door lock actuator 5 to lock or unlock the door by placing the high priority on the stored signal.

After the predetermined time period elapsed from starting timer 13 in response to closing the door, CPU 11 entirely accepts the lock or unlock operation executed by door locking knob 7 of each door. When the signal of overlay switch 8 is inputted to CPU 11, CPU 11 controls door lock actuator 5 on the basis of the signal of overlay switch 8 with the highest priority.

The manner of operation of the embodiment of the door lock/unlock system according to the present invention is discussed hereinafter with reference to a flowchart shown in FIG. 2. CPU 11 has stored this flowchart explaining the operation of door-lock controller 1 in the form of a program, and this program starts when door-lock controller 1 is connected to a power source such as battery.

CPU 11 reads the signals of door-lock-state detection switch 2, door-open-state detection switch 3 and overlay switch 8 at predetermined time intervals and detects a change of each signal. Although this flowchart explains the operation as to one of the plurality of doors of the vehicle, door-lock controller 1 actually controls the four doors of the vehicle in parallel.

At step S101 CPU 11 of door-lock controller 1 determines whether door-open-state detection switch 3 is put in on state or off state, that is, whether the door is open or closed. When the determination at step S101 is affirmative, that is, when the door is open, the program proceeds to step S102. When the determination at step S101 is negative, that is, when the door is closed the program proceeds to step S104.

At step S102 CPU 11 reads a signal S1 which indicates whether the door is locked or unlocked, from door-lock-state detection switch 2.

At step S103 CPU 11 stores the signal S1 as a signal S1' in memory-12. After the execution of step S103, the program returns to step S101. The processing during steps S101 through S103 means that during the door open period CPU 11 reads the signal indicative of the state of door-lock-state detection switch 2 and overwrites it in memory 12 at predetermined time intervals. By this processing, door-lock controller 1 can detect the lock/unlock state of the door even if door lock mechanism 6 is put in the lock or unlock state through the operation of door locking knob 7 or a concentrated lock/unlock operation switch of overlay switch 8.

At step S104 subsequent to the negative determination at step S101, CPU 11 determines whether the state of door-open-state detection switch 3 is changed from the on state to the off state, that is, whether the door is closed or not. When the determination at step S104 is affirmative, that is, when the change from the door open state to the door closed state is detected, the program proceeds to step S105. When the determination at step S104 is negative, that is, when the change from the door open state to the door closed state is not detected, the program proceeds to a return block to terminate the present routine.

At step S105 CPU 11 starts the operation of timer 13 so as to start a counting of the predetermined time period from a moment the door open state is changed from the open state to the closed state.

At step S106 subsequent to the execution of step S105, CPU 11 reads the content of timer 13. Initially, timer 13 is set at 500 milliseconds, and the counting down of the set time starts at step S105.

At step S107 CPU 11 reads the signal of door-lock-state detection switch 2 as signal S1.

At step S108 CPU 11 determines whether or not the content of timer 13 is smaller than or equal to 0 milliseconds. When the determination at step S108 is affirmative, the program proceeds to step S109. When the determination at step S108 is negative, the program returns to step S107.

By reading the signal of door-lock-state detection switch 2 for 500 milliseconds, CPU 11 detects the change of the door lock state due to the door closing operation. Although the embodiment has been shown and described such that the initial setting of timer is 500 milliseconds, it is not limited to this setting, and it is preferable that the set time period is smaller than or equal to a time period obtained by summing a first time period from a moment of closing the door due to the passenger's getting-in to the vehicle to a moment of operating the door lock/unlock operation know, and a second time period necessary for operating the door lock mechanism.

Experimentally a time period necessary for operating the door lock/unlock operation knob according to the driver's intent from a moment of closing the door, is at least 300 milliseconds. Further a time period for operating the door lock mechanism normally ranges from 200 to 300 milliseconds. Therefore, by setting the set time at 500 milliseconds, it becomes possible that CPU 11 distinguishes between the passengers' operation and an erroneous operation of the door lock mechanism due to impact generated by a radical door closing operation.

At step S109 CPU 11 compares signal S1' stored in memory 12 and signal S1 read at step S107. When signal S1' corresponds to signal S1 (S1'=S1), the program proceeds to step S111 wherein CPU 11 resets timer 13. The correspondence between signal S1' and signal S1 means that door-lock controller 1 checked that the door is closed after the door lock state is set and that the impact generated by closing the door did not induce an erroneous operation of the door lock mechanism. When the determination at step S109 is negative, that is, when signal S1' stored in memory 12 is different from signal S1, the program proceeds to step S110.

At step S110 CPU drives door lock actuator 5 so that door-lock-state detection switch 2 outputs a signal corresponding to signal S1' stored in memory 12. At step S111 subsequent to the execution of step S110, CPU 11 resets timer 13. After the execution of step S111, the program returns to a start block of this program.

Door-lock controller 1 accepts the determination as to an erroneous operation of the door lock mechanism just after closing the door, and the operation of the lock/unlock operation knob or of the door lock mechanism according to the signal of overlay switch 8.

Door locking knob 7 (7*a*, 7*b*, 7*c*, 7*d*) of the embodiment functions as lock/unlock operation means. Door lock mechanism 6 (6*a*, 6*b*, 6*c*, 6*d*) including door lock actuator 5 (5*a*, 5*b*, 5*c*, 5*d*) functions as lock/unlock mechanism. Door-lock-state detection switch 2 (2*a*, 2*b*, 2*c*, 2*d*) functions as lock/unlock state detecting means. Door-open-state detection switch 3 functions as open/close state detecting means.

Door-lock controller 1 functions as lock/unlock controlling means. CPU 11 and timer 13 function as time counting means.

The embodiment according to present invention is arranged such that the lock/unlock state just before closing the door is stored as signal S1' of door-lock-state detection switch 2. Signal S1 of door-lock-state detection switch 2 and signal S1' stored in memory 12 are compared. When signal S1 does not corresponds to signal S1', door lock actuator 5 is controlled according to signal S1' prior to signal S1. This arrangement prevents unintended lock or unlock of the door, such as the state change due to the impact caused by closing the door.

Although the embodiment according to the present invention has been shown and described such that door-lock controller 1 comprises timer 13, other counting function such as periodic signals controlled at a multiple of a clock cycle of CPU 11 may be employed instead of the counting function of timer 13.

Although the embodiment according to the present invention has been shown and described such that door locking knob 7 (7*a*, 7*b*, 7*c*, 7*d*) is interconnected with door lock mechanism 6 (6*a*, 6*b*, 6*c*, 6*d*) via a rod or cable, other arrangement may be employed, for example, it may be arranged such that a knob position detection switch is independently provided for each door locking knob, and that door-lock controller 1 controls door lock actuator 5 according to a lock/unlock indicative signal of the knob detection switch to properly drive each door-lock mechanism 6.

This application is based on prior Japanese Patent Application No. 2002-296724. The entire contents of the Japanese Patent Application No. 2002-296724 with a filing date of Oct. 9, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A door lock/unlock system for a vehicle, comprising:

a door lock state detector detecting whether a door of the vehicle is put in a lock state;

a door open state detector detecting whether the door is open;

a door lock mechanism through which the door is locked and unlocked; and a controller connected to the door lock state detector, the door open state detector and the lock mechanism, the controller being arranged, to compare a first lock/unlock state detected by the door lock state detector during the door open state with a second lock/unlock state detected by the door lock state detector at a moment when an open/close state is changed from an open state to a closed state, to maintain the state of the door lock mechanism when the first lock/unlock state equals to the second lock/unlock state, and to set the state of the door lock mechanism at the first lock/unlock state when the first lock/unlock state does not equal to the second lock/unlock state.

2. The door lock/unlock system as claimed in claim 1, wherein the controller is further arranged to count a time period from a moment that the open/close state is changed from the open state to the closed state and to compare the first lock/unlock state and the second lock/unlock state when the counted time period is smaller than the predetermined time period.

3. The door lock/unlock system as claimed in claim 1, wherein the door lock mechanism comprises a door lock actuator which is connected to the controller and though which the door lock mechanism changes the lock/unlock state of the door.

4. The door lock/unlock system as claimed in claim 1, wherein the door lock state detector, the door open state detector and the door lock mechanism are attached to each of the doors of the vehicle.

5. The door lock/unlock system as claimed in claim 1, wherein the controller is further arranged to update a lock/unlock state detected by the door lock state detector which is stored in a memory of the controller as the first lock/unlock state, when the door is open.

6. The door lock/unlock system as claimed in claim 1, further comprising an overlay switch for setting the lock/unlock state with a priority to the determination based on the door lock state detector.

7. The door lock/unlock system as claimed in claim 6, wherein the overlay switch includes a concentrated door lock/unlock switch through which a driver of the vehicle concentratedly controls the door lock/unlock state of all of the doors of the vehicle.

8. The door lock/unlock system as claimed in claim 1, further comprising a door locking knob through which a vehicle occupant in a passenger compartment of the vehicle is capable of locking the door.

9. A method for controlling a lock/unlock state of a door of a vehicle, the method comprising:

detecting whether the door is put in a lock state;

detecting whether the door is open;

comparing a first lock/unlock state detected during the door open state with a second lock/unlock state detected at a moment when an open/close state is changed from an open state to a closed state;

maintaining the state of a door lock mechanism for locking and unlocking the door when the first lock/unlock state equals to the second lock/unlock state; and setting the state of the door lock mechanism at the first lock/unlock state when the first lock/unlock state does not equal to the second lock/unlock state.

10. A door lock/unlock system for a vehicle, comprising:

lock/unlock operation means for locking and unlocking a door;

lock/unlock mechanism interconnected with the lock/unlock operation means, the lock/unlock mechanism locking and unlocking the door according to an operation of the lock/unlock operation means;

door open state detecting means for detecting an open/close state of the door;

door lock state detecting means for detecting a lock/unlock state of the door; and door lock/unlock controlling means for controlling an operation of the lock/unlock mechanism, the door lock/unlock controlling means comparing the lock/unlock state detected by the door lock state detecting means during the door open state with the lock/unlock state detected by the door lock state detecting means at a moment that the door open state is changed from an open state to a close state, maintaining the state of the door actuator when the lock/unlock state during the door open state equal to the lock/unlock state at the moment that the open/close state is changed from the open state to the close state, and setting the lock/unlock state of the door lock mechanism at the lock/unlock state during the door open state when the lock/unlock state during the door open state does not equal to the lock/unlock state at the moment that the open/close state is changed from the open state to the close state.

* * * * *